(12) United States Patent
Gauthier et al.

(10) Patent No.: US 12,128,950 B2
(45) Date of Patent: Oct. 29, 2024

(54) METHOD DESIGNED TO SLAVE THE POSITION OF A VEHICLE STEERING RACK TO A POSITION SETPOINT ON THE BASIS OF DYNAMIC CONSTRAINTS IMPOSED ON A MOVEMENT OF THE VEHICLE

(71) Applicant: JTEKT EUROPE, Irigny (FR)

(72) Inventors: Christophe Gauthier, Chasse sur Rhône (FR); Johan Aubier, Villeurbanne (FR)

(73) Assignee: JTEKT EUROPE, Irigny (FR)

( * ) Notice: Subject to any disclaimer, the term of this patent is extended or adjusted under 35 U.S.C. 154(b) by 203 days.

(21) Appl. No.: 17/792,513

(22) PCT Filed: Jan. 11, 2021

(86) PCT No.: PCT/FR2021/050041
§ 371 (c)(1),
(2) Date: Jul. 13, 2022

(87) PCT Pub. No.: WO2021/144525
PCT Pub. Date: Jul. 22, 2021

(65) Prior Publication Data
US 2023/0057494 A1 Feb. 23, 2023

(30) Foreign Application Priority Data
Jan. 13, 2020 (FR) ........................ 2000254

(51) Int. Cl.
*B62D 15/02* (2006.01)
*B62D 5/04* (2006.01)
*B62D 6/02* (2006.01)

(52) U.S. Cl.
CPC ......... *B62D 15/025* (2013.01); *B62D 5/0409* (2013.01); *B62D 6/02* (2013.01)

(58) Field of Classification Search
CPC .................. B62D 15/025; B62D 6/02
See application file for complete search history.

(56) References Cited

U.S. PATENT DOCUMENTS

| 2009/0037054 A1* | 2/2009 | Igarashi | B62D 5/008 701/42 |
| 2013/0030653 A1* | 1/2013 | Soos | B62D 15/0235 701/41 |

(Continued)

FOREIGN PATENT DOCUMENTS

| DE | 102019108996 A1 | 10/2019 |
| DE | 112017006875 T5 | 10/2019 |
| WO | 2012/076805 A1 | 6/2012 |

OTHER PUBLICATIONS

May 11, 2021 International Search Report issued in International Patent Application No. PCT/FR2021/050041.

(Continued)

*Primary Examiner* — Long T Tran
(74) *Attorney, Agent, or Firm* — Oliff PLC

(57) ABSTRACT

A method for controlling an assist motor of a power steering system, power steering system including the assist motor configured to apply a motor torque on a rack, and at least one steering computer, method being designed to servo-control a position of the rack to a position setpoint, method including: a maneuvering step in which the assist motor exerts a motor torque on the rack according to a motor torque setpoint; wherein the method also includes: servo-control step in which the steering computer determines a speed setpoint of the rack according to the position setpoint and to the position of the rack; limitation step in which the steering computer issues a limited speed setpoint which is lower than or equal to a maximum speed threshold; control step in (Continued)

which the steering computer determines the motor torque setpoint according to the limited speed setpoint and to a speed of the rack.

7 Claims, 4 Drawing Sheets

(56) References Cited

U.S. PATENT DOCUMENTS

| | | | | |
|---|---|---|---|---|
| 2013/0124048 | A1* | 5/2013 | Gruener | B62D 5/0472 |
| | | | | 701/42 |
| 2013/0304324 | A1* | 11/2013 | Campo | B62D 15/025 |
| | | | | 701/41 |
| 2019/0308664 | A1 | 10/2019 | Pramod et al. | |
| 2020/0086913 | A1 | 3/2020 | Tsukahara et al. | |
| 2020/0346688 | A1* | 11/2020 | Otto | B60W 50/045 |
| 2020/0361526 | A1* | 11/2020 | Stoltze | B62D 15/025 |
| 2020/0391792 | A1* | 12/2020 | Loussaut | G01M 17/06 |
| 2020/0391793 | A1* | 12/2020 | Loussaut | G01L 5/221 |

OTHER PUBLICATIONS

May 11, 2021 Written Opinion issued in International Patent Application No. PCT/FR2021/050041.

\* cited by examiner

METHOD DESIGNED TO SLAVE THE POSITION OF A VEHICLE STEERING RACK TO A POSITION SETPOINT ON THE BASIS OF DYNAMIC CONSTRAINTS IMPOSED ON A MOVEMENT OF THE VEHICLE

The invention relates to the field of the power steering systems and more particularly to a method designed to servo-control a position of a rack to a position setpoint.

The purpose of a steering system of a vehicle is to enable a driver to control a trajectory of the vehicle by exerting a force on a steering wheel.

Generally, a steering system comprises several elements including said steering wheel connected to a steering column, a rack, and two wheels each connected to a tie rod. The rack is the part allowing connecting the steering wheel, via the steering column, to the wheels, via the tie rods; that is to say that the rack transforms the forces exerted by the driver on the steering wheel into a rotation of the wheels of the vehicle. More specifically, the rack carries out a rectilinear movement between a neutral position in which the moving vehicle carries out a rectilinear trajectory, and a straight position, respectively a left position, in which the vehicle carries out a curved trajectory to the right, respectively to the left. Next, a position of the rack is defined as the length, measured in millimeters, of the center of the rack with respect to the neutral position.

An electric power steering system of a vehicle uses an assist motor, controlled by a steering computer, in particular to reduce the effort to be applied by the driver on the steering wheel to turn the wheels of the vehicle. Based on the forces exerted on the steering wheel, that is to say the steering wheel torque, the assist motor exerts an assistance force, that is to say a motor torque, on the rack so as to turn the wheels.

The power steering system may also comprise a driving assistance function, such as a parking assistance function ("city park") or a traffic-lane vehicle keeping assistance function ("lane keeping"). This function automatically controls the trajectory, hereinafter referred to as actual, of the vehicle. In other words, the driving assistance function determines a reference trajectory and requires that the actual trajectory of the vehicle remains close to the reference trajectory.

The actual trajectory of the vehicle is imposed by the driving assistance function by servo-controlling the position of the rack to a position setpoint which is dependent on the reference trajectory. In this way, the actual trajectory of the vehicle is kept close to the reference trajectory.

There is a known method 1', represented in FIG. 1, allowing to carry out such a servo-control which comprises:
- a position servo-control step 2' in which the steering computer determines a motor torque setpoint $T_{CM}$ according to the position setpoint $T_X$, and to the rack position $X_S$;
- a maneuvering step 3 in which the assist motor exerts a motor torque $C_M$ on the rack S according to the motor torque setpoint $T_{CM}$.

Such a method 1' has a closed-loop regulation on the position $X_S$ of the rack S. In other words, the method modifies the position $X_S$ of the rack S by means of the motor torque $C_M$ of the assist motor as long as the position $X_S$ of the rack S is not equal to the position setpoint $T_X$. Thus, the method 1' allowing keeping the actual trajectory of the vehicle by means of the control of the position $X_S$ of the rack 5, close to the reference trajectory indicated by the position setpoint $T_X$.

A dynamic reaction of the steering system directly depends on variations in a structure of the environment of said steering system, in particular the weight and a state of the traffic surface of the vehicle. The dynamic reaction of the vehicle depends on the kinematic constraints exerted on the vehicle.

With the method 1' above and depending on the structure of the environment of the steering system, a sudden and rapid movement of the rack S can be observed. This degrades the feeling of the driver and the safety of the vehicle. This method cannot manage variations in the structure of the environment without modifying at least one parameter.

The object of the invention is to overcome all or part of the aforementioned drawbacks by proposing a method for servo-controlling the position of the rack wherein the speed and/or the acceleration of the rack remain below a determined threshold whatever the changes in the structure of the environment of the power steering system.

The subject of the invention is a method for controlling an assist motor of a power steering system, said power steering system comprising the assist motor configured to apply a motor torque to a rack, and at least one steering computer, said method being designed to servo-control a position of the rack to a position setpoint, said method comprising:
- a maneuvering step in which the assist motor exerts a motor torque on the rack according to a motor torque setpoint;

characterized in that the method also comprises:
- a servo-control step in which the steering computer determines a speed setpoint of the rack according to the position setpoint and to the position of the rack;
- a limitation step in which the steering computer issues a limited speed setpoint which is lower than or equal to a maximum speed threshold;
- a control step in which the steering computer determines the motor torque setpoint according to the limited speed setpoint and to a speed of the rack.

The control method according to the invention comprises two closed-loop regulations nested one inside the other, that is to say in cascade.

The first closed-loop regulation is carried out by the servo-control step. Indeed, the servo-control step determines a magnitude, here the speed setpoint, so that the position of the rack is equal to the position setpoint. By taking into account the current position of the rack, the servo-control step integrates a feedback of the power steering system.

The servo-control step modifies the speed setpoint so as to require that the position of the rack is substantially equal to the position setpoint. Thus, the method according to the invention allows keeping an actual trajectory of the vehicle by means of the control of the position of the rack, close to the reference trajectory indicated by the position setpoint.

The second closed-loop regulation is carried out by the control stage. Indeed, the control step determines a magnitude, here the motor torque setpoint, so that the speed of the rack is equal to the limited speed setpoint. By taking into account the current speed of the rack, the control step integrates a feedback of the power steering system.

The control step modifies the motor torque setpoint so as to require that the speed of the rack is sensitively equal to the limited speed setpoint. Thus, the method according to the invention allows keeping the speed of the rack, close to the limited speed setpoint.

The limitation step requires that the limited speed setpoint is equal to the speed setpoint when the speed setpoint is lower than the maximum speed threshold and is equal to the maximum speed threshold when the speed setpoint is higher than or equal to the maximum setpoint threshold. In other words, the limitation step imposes a maximum boundary corresponding to the maximum speed threshold to the speed setpoint of the rack.

Thus, the limited speed setpoint of the rack is known, reproducible and adjustable.

The method according to the invention ensures, by requiring that the rack speed is equal to a limited speed setpoint, that the rack carries out a continuous, predictable and gradual movement so as to preserve the feeling of the driver and the safety of the vehicle.

According to a feature of the invention, the servo-control step comprises a comparison phase in which a position deviation is calculated according to the position of the rack and to the position setpoint, then a correction phase in which the speed setpoint is determined in such a way as to reduce the position deviation.

The comparison phase calculates a position deviation, for example by subtracting the position of the rack from the position setpoint.

The correction phase determines a speed setpoint according to the position deviation by means of a predetermined mathematical relationship.

Thus, the servo-control step is a closed-loop regulation.

According to a feature of the invention, the control step comprises a deviation phase in which a speed deviation is calculated according to the speed of the rack and to the limited speed setpoint, then a compensation phase in which the motor torque setpoint is determined so as to reduce the speed deviation.

The deviation phase calculates a position deviation, for example by subtracting the speed of the rack from the limited speed setpoint.

The compensation phase determines the motor torque setpoint according to the speed deviation by means of a predetermined mathematical relationship.

Thus, the control stage is a closed-loop regulation.

According to a feature of the invention, the limitation step determines the maximum speed threshold of the rack according to at least one kinematic constraint exerted on the vehicle.

Thus, the limitation step allows adapting the method to a dynamic reaction of the steering system by taking into account at least one kinematic constraint. The method adapts to different vehicles but also to changes in the state of the traffic surface of the vehicle.

The speed setpoint of the rack is adapted to the at least one kinematic constraint.

The method according to the invention can be installed on different vehicles without modifying it because the changes in vehicle weight, and more generally the changes in the kinematic constraints are automatically taken into account during the limitation step.

According to a feature of the invention, the limitation step determines the limited speed setpoint according to a maximum acceleration threshold;

Thus, the speed setpoint is limited but also the maximum acceleration of the rack.

It is possible to define exactly a dynamics of the movement of the rack by limiting the speed and the acceleration.

According to a feature of the invention, the maximum acceleration threshold is determined according to at least one kinematic constraint exerted on the vehicle.

Thus, the dynamics of the vehicle are adapted according to at least one kinematic constraint. The method adapts to different vehicles but also to changes in the state of the traffic surface of the vehicle.

According to a feature of the invention, the position of the rack is obtained by either: a position sensor, an angular measurement of a steering wheel, a mathematical calculation using an angular measurement of a shaft of the assist motor.

Thus the method is not constrained by a method for determining the position of the rack.

The invention will be better understood, thanks to the description below, which relates to several embodiments according to the present invention, given as non-limiting examples and explained with reference to the appended schematic drawings, in which.

The invention relates to a method 1 for managing an assist motor 12 of a power steering system 100 for a vehicle 21, and more particularly for a motor vehicle 21 intended for the transport of persons.

Figure 7:
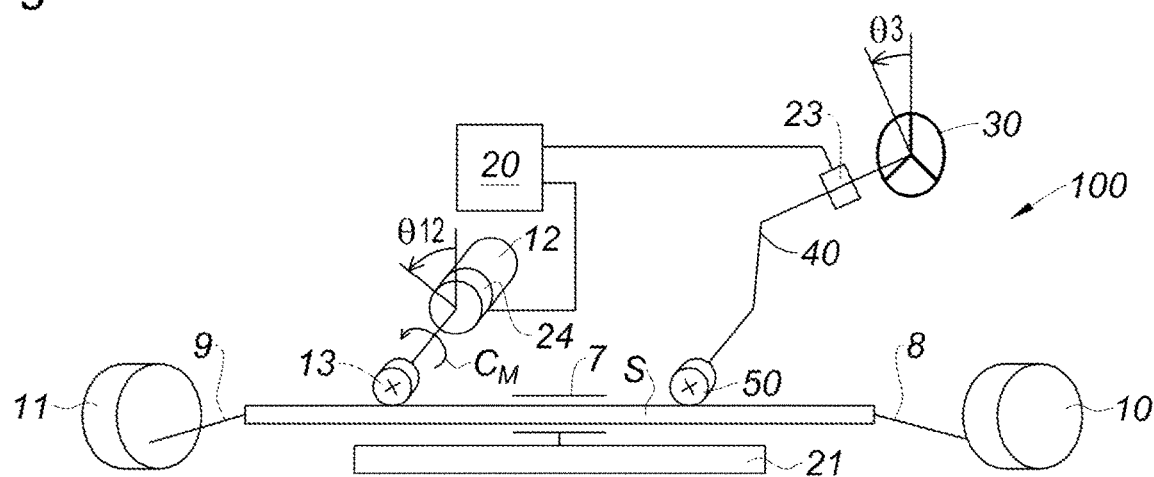
FIG. 7 is a schematic representation of a steering system of a vehicle.

In a manner known per se, and as shown in FIG. 7, said power steering system 100 comprises a steering wheel 30 which allows a driver to maneuver said power steering system 100 by exerting a force on said steering wheel 30.

Said steering wheel 30 is preferably mounted on a steering column 40, guided in rotation on the vehicle 21, and which meshes, by means of a steering pinion 50, with a rack S, which is itself guided in translation in a steering casing 7 fastened to said vehicle 21.

Preferably, each of the ends of said steering rack S is connected to a steering tie rod 8, 9 connected to the steering knuckle of a steered wheel 10, 11 (respectively a left wheel 10 and a right wheel 11), such so that the translational longitudinal displacement of the rack S allows modifying the steering angle (yaw angle) of the steered wheels.

Moreover, the steered wheels 10, 11 can preferably also be drive wheels.

The power steering system 100 also comprises the assist motor 12 intended to provide a motor torque $C_M$, to assist the maneuver of said power steering system 100.

The assist motor 12 will preferably be an electric motor, with two directions of operation, and preferably a rotary electric motor, of the brushless type. The assist motor 12 can come into engagement, where necessary via a reducer of the gear reducer type, either on the steering column 40 itself, to form a so-called "single pinion" mechanism, or directly on the rack S, for example by means of a second pinion 13 distinct from the steering pinion 50 which allows the steering column 40 to mesh with the rack S, so as to form a so-called "double pinion" mechanism, as illustrated in FIG.

7, or else by means of a ball screw which cooperates with a corresponding thread of said rack S, at a distance from said steering pinion 50.

The steering system further comprises a steering computer 20 which implements the method 1 according to the invention. More specifically, the steering computer 20 receives the information of a position $X_S$ of the rack S either by means of a position sensor, or by an angular measurement θ3 of the steering wheel 30 which is carried out by an angle sensor 23, or by a mathematical calculation using an angular measurement θ12 of a shaft 24 of the assist motor 12.

Figure 1:
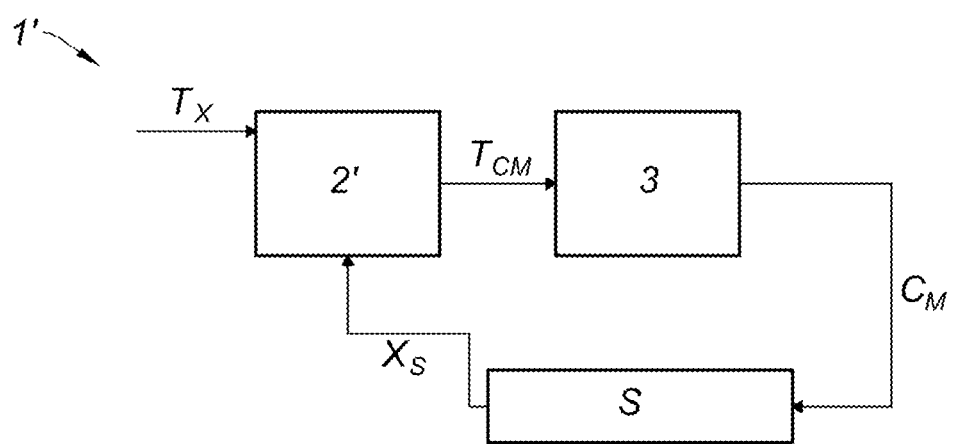
FIG. 1 is a schematic representation of a method for controlling an assist motor according to the prior art.
Figure 2:
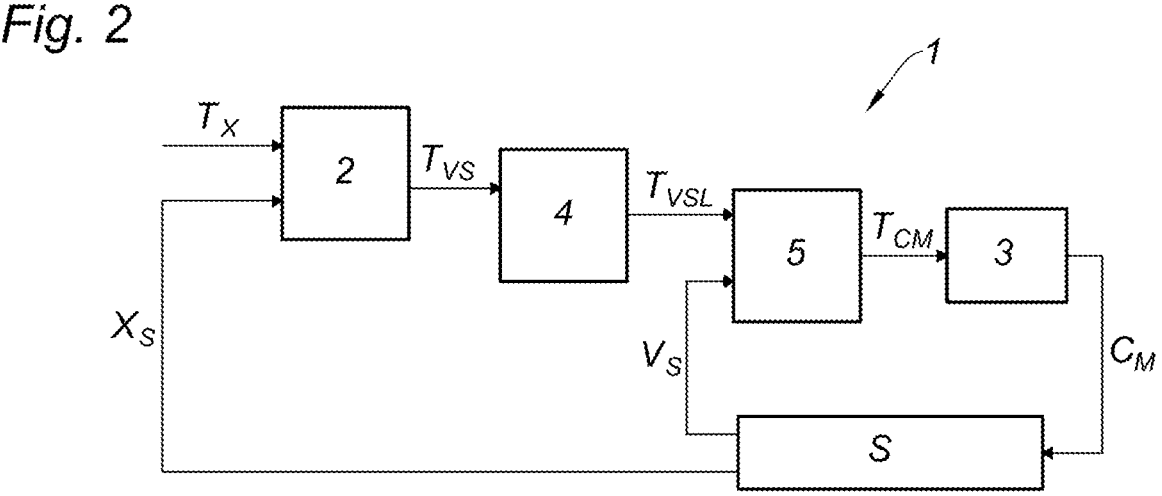
FIG. 2 is a schematic representation of a method for controlling an assist motor according to the invention.

The steering system 100 comprises the control method 1, as represented in FIG. 2.

The method 1 for controlling the assist motor 12 of the power steering system 100 comprises a servo-control step 2 in which the steering computer 20 determines a speed setpoint $T_{VS}$ of the rack S according to a position setpoint $T_X$ and to the position $X_S$ of the rack S.

More specifically, the servo-control step 2 comprises a comparison phase in which a position deviation is calculated according to the position $X_S$ of the rack S and to the position setpoint $T_X$.

The comparison phase calculates the position deviation by subtracting the position $X_S$ of the rack S from the position setpoint $T_X$.

Then, the servo-control step 2 comprises a correction phase in which the speed setpoint $T_{VS}$ is determined so as to reduce the calculated position deviation. The servo-control step 2 is therefore a first closed-loop regulation which determines the speed setpoint $T_{VS}$ so that the position $X_S$ of the rack S is equal to the position setpoint $T_X$.

The method 1 according to the invention then comprises a limitation step in which the steering computer issues a limited speed setpoint $T_{VSL}$.

The speed setpoint $T_{VS}$ is conditioned by speed and acceleration kinematic constraints exerted on the vehicle 21. For this purpose, the speed setpoint $T_{VS}$ is bounded by a maximum speed threshold $SV_S$ and its derivative with respect to time, in other words its acceleration, is bounded by a maximum acceleration threshold $SA_S$. The maximum speed threshold $SV_S$ and the maximum acceleration threshold $SA_S$ depend on at least one kinematic constraint.

The method 1 also comprises a control step 5 in which the steering computer 20 determines a motor torque setpoint $T_{CM}$ according to the limited speed setpoint $T_{VSL}$ and to a speed $V_S$ of the rack S.

The control step comprises a deviation phase in which a speed deviation is calculated by subtracting the speed $V_S$ of the rack S from the limited speed setpoint $T_{VSL}$.

The control step also comprises a compensation phase in which the motor torque setpoint is determined so as to reduce the speed deviation.

The control step 5 corresponds to a second closed-loop regulation positioned in parallel with the first regulation loop. Indeed, the control step 5 determines the motor torque setpoint $T_{CM}$ by using as input the limited speed setpoint $T_{VSL}$ which is the output of the first control loop, and by using the speed $V_S$ of the rack S which is measured at the same time as the position $X_S$ of the rack S.

The control step 5 modifies the motor torque setpoint $T_{CM}$, so as to impose that the speed $V_S$ of the rack S is substantially equal to the limited speed setpoint $T_{VSL}$.

Finally, the method 1 comprises a maneuvering step 3 in which the assist motor 12 exerts the motor torque $C_M$ on the rack S according to the motor torque setpoint $T_{CM}$.

The method 1 is designed to servo-control a position $X_S$ of the rack S to a position setpoint $T_X$, which is carried out by the servo-control step 2, while keeping a speed $V_S$ of the rack S at a value lower than a threshold which is carried out by the step of limitation 4 and control 5.

Thus, the method 1 according to the invention allows, on the one hand, keeping an actual trajectory of the vehicle 21 by means of the control of the position $X_S$ of the rack 5, close to the reference trajectory indicated by the position setpoint $T_X$, and on the other hand keeping the speed $V_S$ of the rack S close to the limited speed setpoint $T_{VSL}$.

Figure 3:
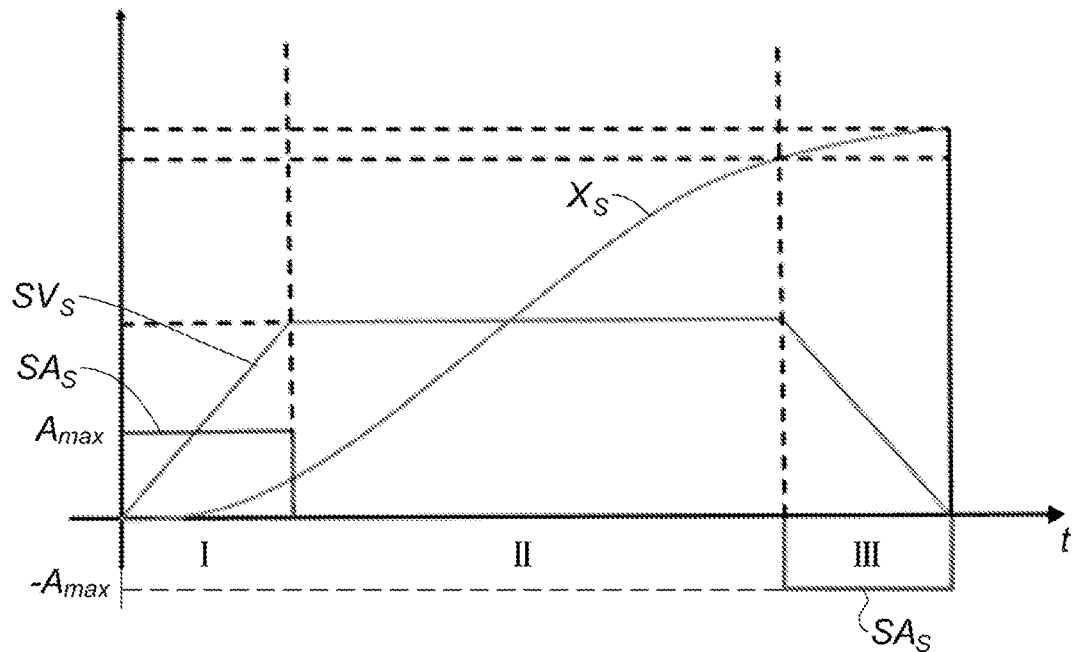
FIG. 3 is a schematic representation of a position of the rack, of a maximum speed threshold and of a maximum acceleration threshold, over time.

FIG. 3 illustrates the position $X_S$ of the rack S, the maximum speed threshold $SV_S$ and the maximum acceleration threshold $SA_S$ according to the time t.

In FIG. 3, the speed setpoint $T_{VS}$ has a value higher than the maximum speed threshold $SV_S$ and a derivative with respect to time higher than the maximum acceleration threshold $SA_S$. Thus, the limitation step 4 determines that the limited speed setpoint $T_{VSL}$ is constrained on the one hand by the maximum speed threshold $SV_S$ and on the other hand by the maximum acceleration threshold $SA_S$.

In FIG. 3, the maximum acceleration threshold $SA_S$ is constant and equal to the value $A_{max}$ over a first duration I, equal to the value $-A_{max}$ over a third duration III and equal to zero over a second duration II comprised between the first duration I and the third duration III. Thus, the maximum speed threshold $S_{VS}$ is a straight line with a slope coefficient constant over the first I and third III durations, and zero over the third duration III.

Finally, the position $X_S$ of the rack evolves slowly over the first duration I and the third duration III then more rapidly over the second duration II.

Figure 4:
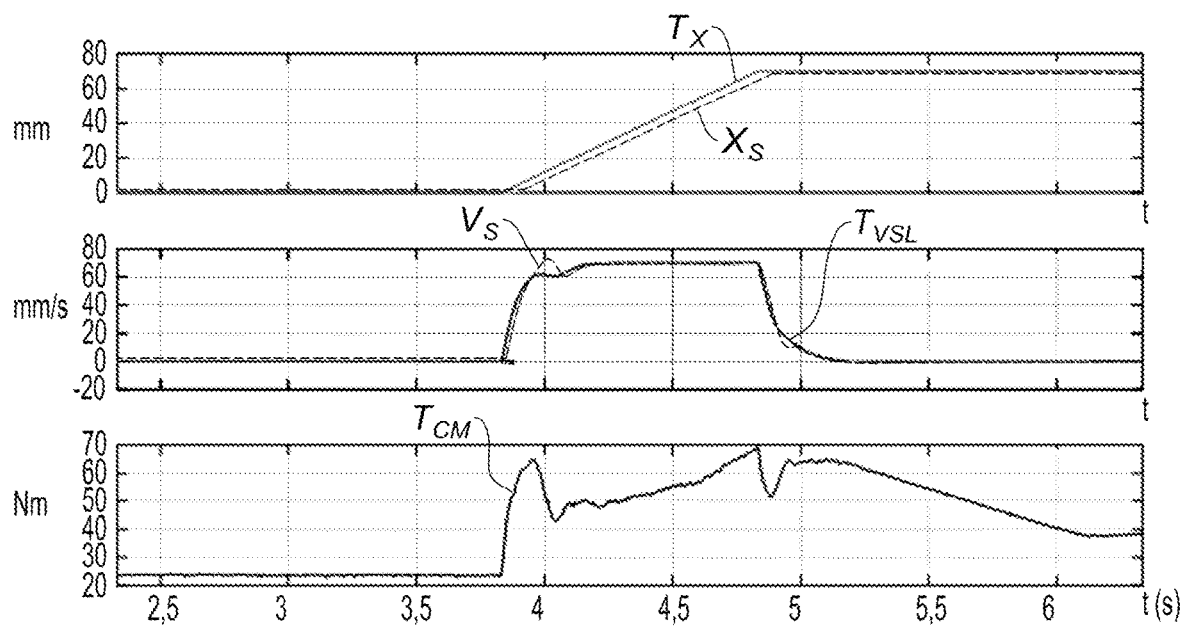
FIG. 4 is a representation of a response of the rack to a position setpoint according to a first embodiment.
Figure 5:
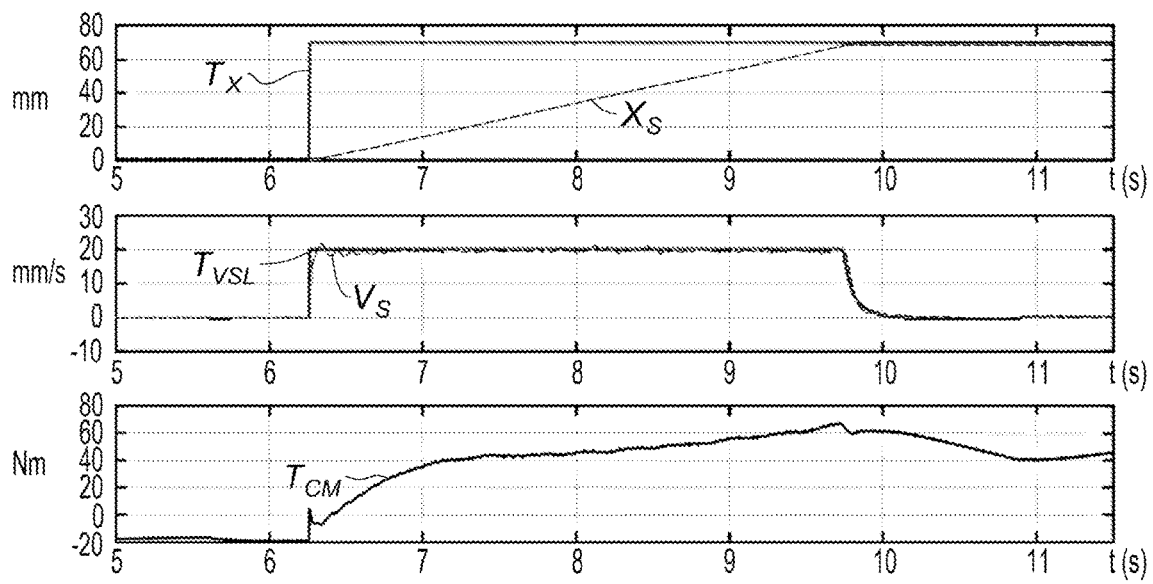
FIG. 5 is a representation of a response of the rack to a position setpoint according to a second embodiment.
Figure 6:
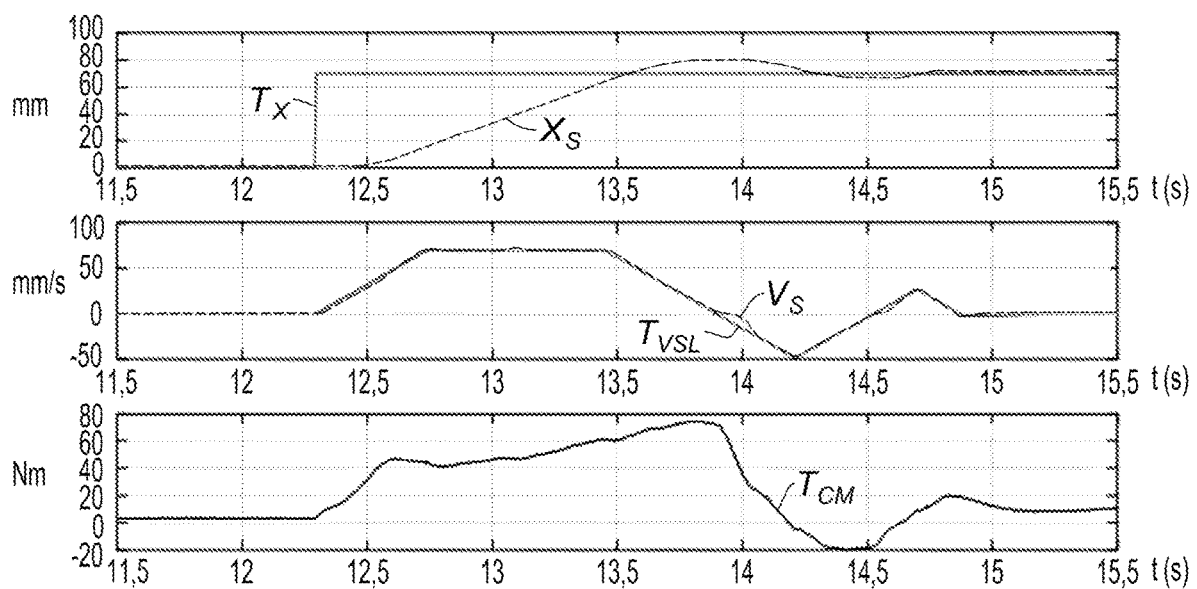
FIG. 6 is a representation of a response of the rack to a position setpoint according to a third embodiment.

FIGS. 4 to 6 illustrate a response of a rack S controlled with the method 1 according to the invention.

More specifically, in the response illustrated in FIG. 4, the maximum speed threshold $SV_S$ is chosen equal to 70 mm/s, and there is no determined value for the maximum acceleration threshold $SA_S$. In addition, the method imposes a position setpoint $T_X$, in the form of a ramp.

FIG. 4 shows that the position $X_S$ of the rack S follows the position setpoint $T_X$ with a slight offset whereas the speed $V_S$ of the rack follows the limited speed setpoint $T_{VSL}$ with the exception of regulation overruns. The motor torque setpoint $T_{CM}$ decreases automatically when the speed $V_S$ of the rack exceeds the limited speed setpoint $T_{VSL}$. Thus, the method 1 according to the invention guarantees that the speed $V_S$ of the rack S does not exceed the limited speed setpoint $T_{VSL}$ with the exception of regulation errors.

In the response illustrated in FIG. 5, the maximum speed threshold $SV_S$ is chosen equal to 20 mm/s, and there is no determined value for the maximum acceleration threshold $SA_S$. In addition, the method imposes a position setpoint $T_X$, in the form of a step.

FIG. 5 shows that the position $X_S$ of the rack S joins the position setpoint $T_X$ following a slope, whereas the speed $V_S$ of the rack S follows the limited speed setpoint $T_{VSL}$ with the exception of regulation overruns. The response of the position $X_S$ of the rack S is independent of the trajectory to be traveled. The rack S reaches the desired position $T_X$ while complying with the constraint of the maximum speed threshold $SV_S$. Thus, the method 1 according to the invention guarantees that the speed $V_S$ of the rack does not exceed the limited speed setpoint $T_{VSL}$ even when the distance to be traveled is significant.

In the response illustrated in FIG. 6, the maximum speed threshold $SV_S$ is chosen equal to 20 mm/s, and the maximum acceleration threshold $SA_S$ is chosen equal to 156 mm/s². In addition, the method imposes a position setpoint $T_X$, in the form of a step.

FIG. 6 shows that the position $X_S$ of the rack S joins the position setpoint $T_X$ following a curve, whereas the speed $V_S$ of the rack S follows the limited speed setpoint $T_{VSL}$ with the exception of regulation overruns. The rack S reaches the desired position $T_X$ while complying with the constraint of the maximum speed threshold $SV_S$ and of the maximum acceleration threshold $SA_S$, with the exception of regulation errors. Thus, the method 1 according to the invention guarantees that the speed $V_S$ of the rack S does not exceed the limited speed setpoint $T_{VSL}$ even when the distance to be traveled is significant, and that the acceleration of the rack remains lower than the maximum acceleration until the end of the movement.

Of course, the invention is not limited to the embodiments described and represented in the appended figures. Modifications are still possible, in particular with regards to the construction of the various elements or by substitution with technical equivalents, yet without departing from the scope of protection of the invention.

The invention claimed is:

1. A method for controlling an assist motor of a power steering system, said power steering system comprising the assist motor configured to apply a motor torque on a rack, and at least one steering computer, the method comprising:
   a maneuvering step in which the assist motor exerts a motor torque on the rack according to a motor torque setpoint;
wherein the method also comprises:
   a servo-control step in which the steering computer determines a speed setpoint of the rack according to a position setpoint and to a position of the rack;
   a limitation step in which the steering computer issues a limited speed setpoint that is based on the speed setpoint, the limited speed setpoint being lower than or equal to a maximum speed threshold;
   a control step in which the steering computer determines the motor torque setpoint according to the limited speed setpoint and to a speed of the rack.

2. The method according to claim 1, wherein the servo-control step comprises a comparison phase in which a position deviation is calculated according to the position of the rack and to the position setpoint, then a correction phase in which the speed setpoint is determined so as to reduce the position deviation.

3. The method according to claim 1, wherein the control step comprises a deviation phase in which a speed deviation is calculated according to the speed of the rack and to the limited speed setpoint, then a compensation phase in which the motor torque setpoint is determined so as to reduce the speed deviation.

4. The method according to claim 1, wherein the limitation step determines the maximum speed threshold of the rack according to at least one kinematic constraint exerted on the vehicle.

5. The method according to claim 1, wherein the limitation step determines the limited speed setpoint according to a maximum acceleration threshold.

6. The method according to claim 5, wherein the maximum acceleration threshold is determined according to at least one kinematic constraint exerted on the vehicle.

7. The method according to claim 1, wherein the position of the rack is obtained by either: a position sensor, an angular measurement of a steering wheel, a mathematical calculation using an angular measurement of a shaft of the assist motor.

* * * * *